United States Patent [19]

Moriyama et al.

[11] Patent Number: 4,516,121

[45] Date of Patent: May 7, 1985

[54] TRANSMISSION CONTROL SYSTEM

[75] Inventors: Masakazu Moriyama; Toshio Shinohara, both of Toyota; Kazuo Hirano; Fumio Makino, both of Osaka, all of Japan

[73] Assignees: Toyota Motor Co., Ltd., Toyota; Sumitomo Electric Industries, Ltd., Osaka, both of Japan

[21] Appl. No.: 385,318

[22] Filed: Jun. 4, 1982

[30] Foreign Application Priority Data

Jun. 18, 1981 [JP] Japan .................................. 56-92968

[51] Int. Cl.³ .......................... H04Q 9/00; B60Q 1/00
[52] U.S. Cl. ................................ 340/825.05; 371/65; 340/52 F
[58] Field of Search ........... 340/825.5, 825.51, 825.54, 340/825.05, 52 F; 371/65; 370/86

[56] References Cited

U.S. PATENT DOCUMENTS 4,360,912  11/1983  Metz ................................ 340/825.54
4,395,710  7/1983  Einolf, Jr. et al. ............... 340/825.5

Primary Examiner—Donald J. Yusko

[57] ABSTRACT

In the system where multiple devices share one circuit by a sequential transmission system, each of the devices is adopted to monitor the transmission from a device one stage before the device which is immediately prior to the device and when a predetermined period of time passes after the transmission from the devices two stages before the device was made, the device is made to start its own transmission without waiting for the transmission from the device immediately therebefore. The transmission control system mentioned above does not fail and the sequential transmission continues even if a part of the devices fails.

8 Claims, 11 Drawing Figures

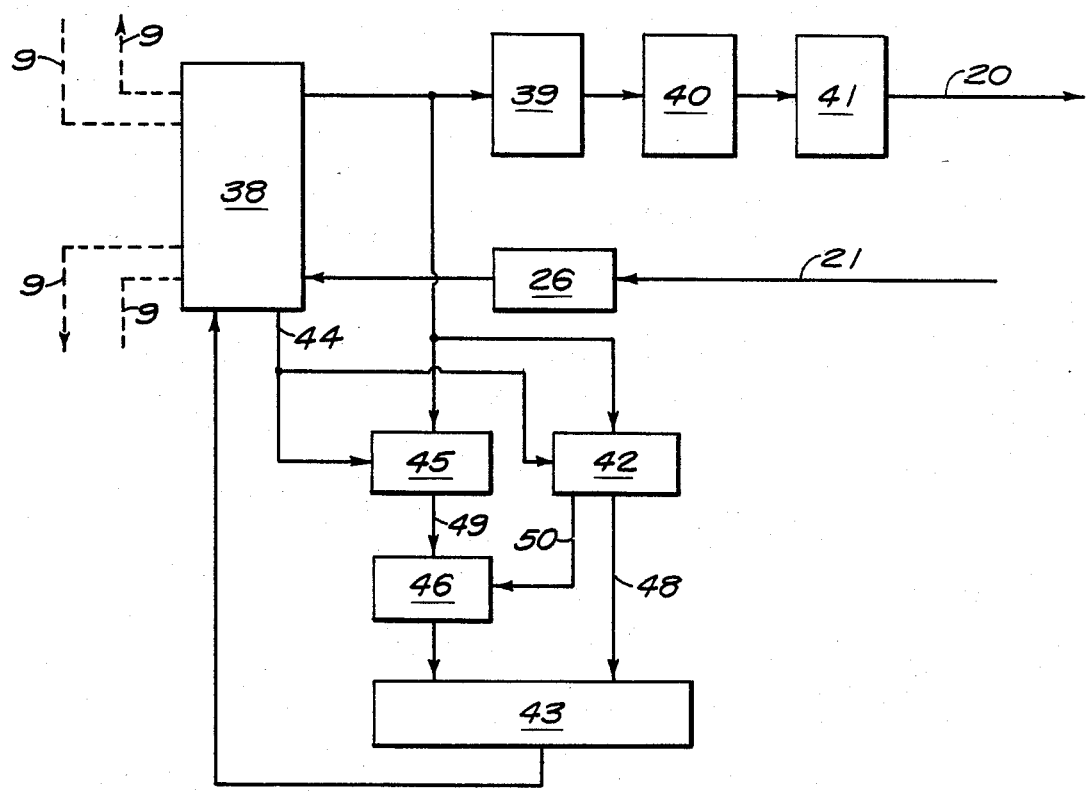

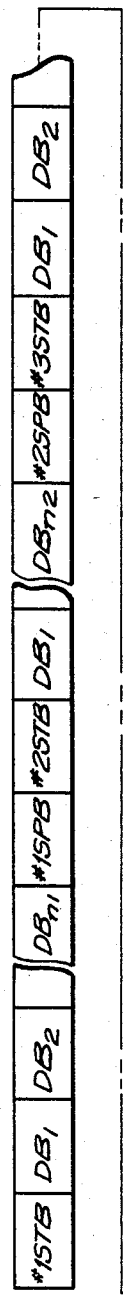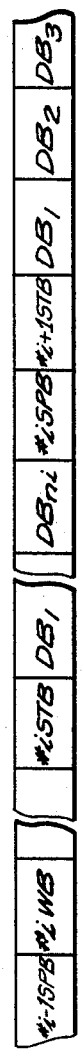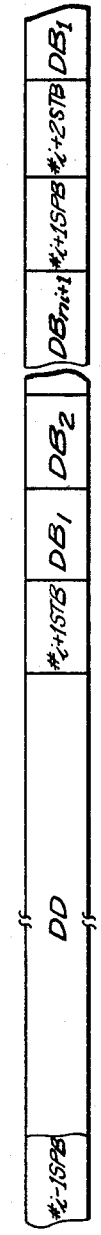
FIG. 6a
FIG. 6b
FIG. 6c

TRANSMISSION CONTROL SYSTEM

BACKGROUND OF THE INVENTION

The present invention concerns a transmission control system for the data transmission system where a circuit is shared by a multiple number of devices by a sequential transmission control system and, more particularly, an improvement thereof so that the system as a whole does not fail even if a part of the devices fails.

In a system like an automobile where the devices to be controlled and the data source devices which provide data necessary for controlling such devices are scattered in a large number, a system of multiplex transmission via a communication control device is employed in order to simplify the connections between respective devices. The sequential transmission system is utilized often in order to reduce the number of communication circuits so that one circuit line is shared by respective communication control devices to carry out transmission in a predetermined sequence.

The conventional sequential transmission system, however, is detrimental in that, since a transmission control device cannot start transmission until the time the transmission control device one stage prior thereto has completed transmission, the data transmissioon through the whole system comes to fail if a part of the communication control devices fails for some reason.

SUMMARY OF THE INVENTION

The present invention aims at providing a transmission control system of sequential transmission method which does not fail as a whole system even if a part of the system fails. In order to attain the purpose mentioned above, the present invention is characterized in that in the data transmission system of the sequential transmission method where one circuit is shared by a multiple number of devices, and each device is to transmit data to the circuit according to a predetermined sequential order, each device comprises the first detecting means to detect transmission from a device immediately prior thereto in the predetermined order and a second detecting means to detect transmission from a device further prior to said device wherein the device can start transmission if the first detecting means does not detect transmission within a predetermined period of time after the second detecting means detects transmission, without waiting for the transmission from the device immediately prior thereto.

BRIEF DESCRIPTION OF THE DRAWINGS

FIGS. 5(a) to (c) are explanatory diagrams to indicate an example of transmission byte formats.

FIGS. 6(a) to (c) are explanatory diagrams to indicate the sequence of transmission and FIG. 7 is a block diagram to show another embodiment of the transmission control system.

DETAILED DESCRIPTION OF PREFERRED EMBODIMENTS

The present invention will now be described referring to a preferred embodiment of the present invention shown in attached drawings.

Figure 1:
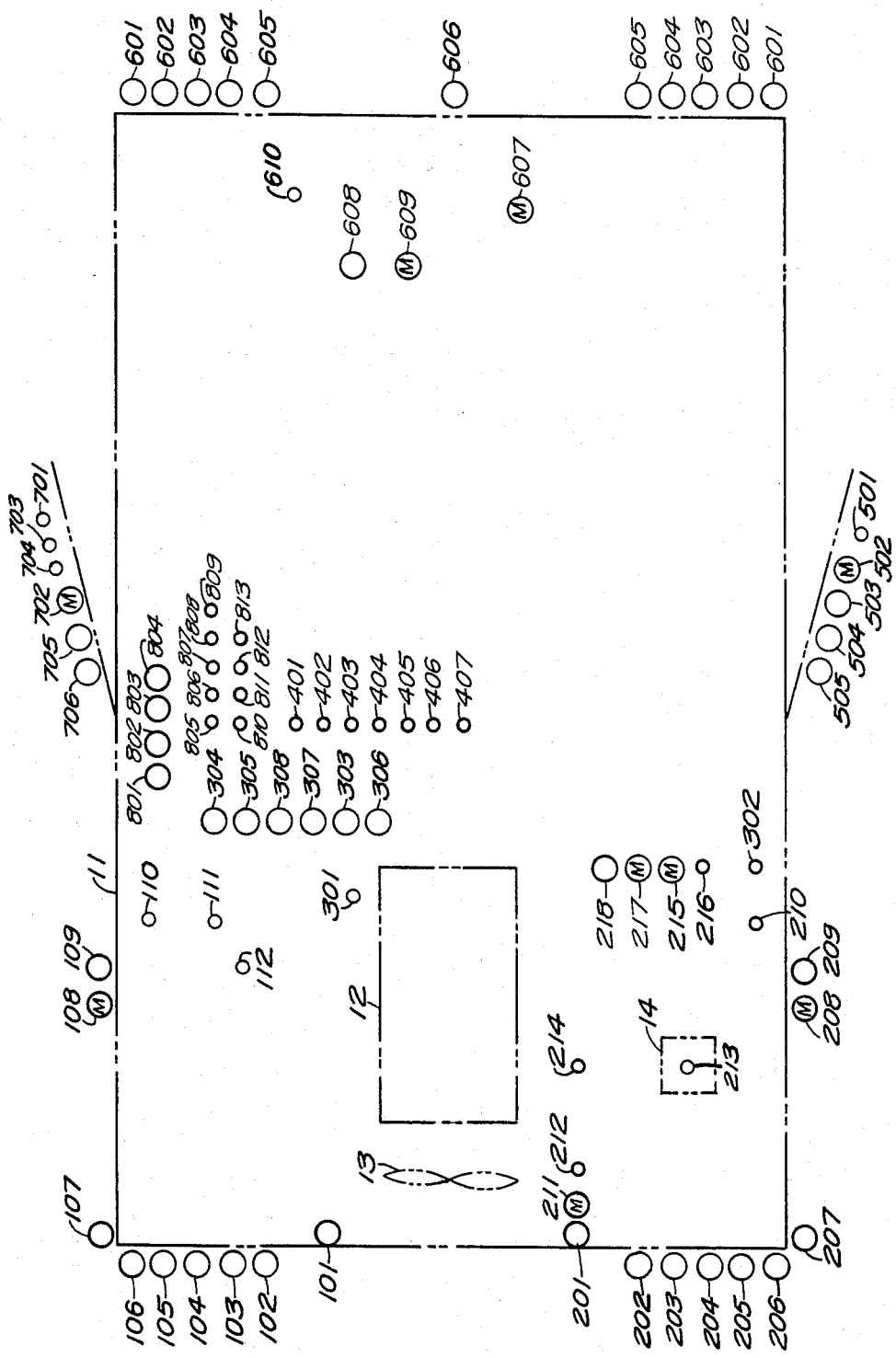
FIG. 1 is an explanatory diagram to show an example of the system which is the object of the present invention.
Figure 2:
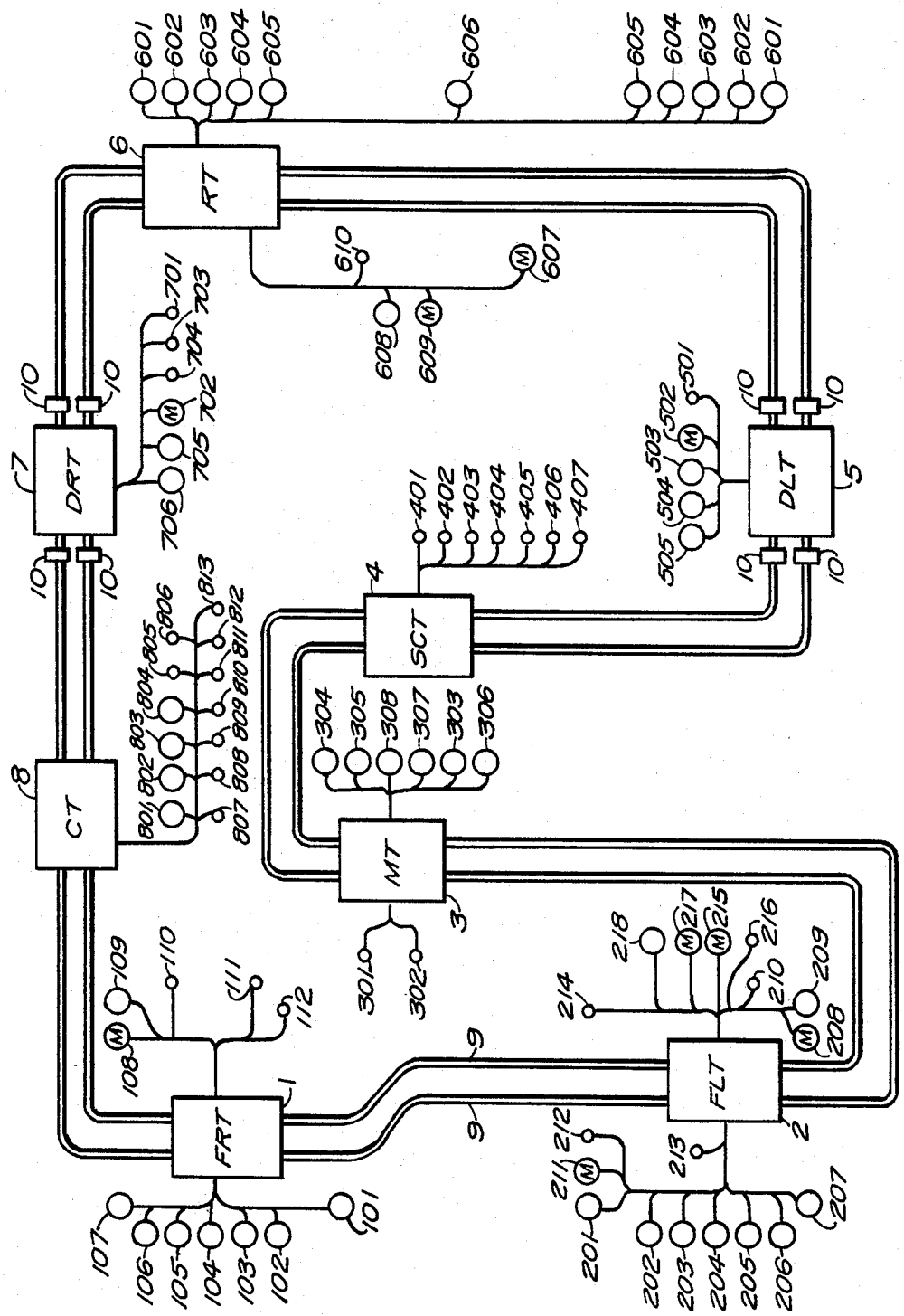
FIG. 2 schematically shows the structure of an embodiment according to the present invention applied to the system in FIG. 1.

FIG. 1 is an explanatory diagram to illustrate an arrangement between the devices to be controled and the data source devices in an automobile which shows an example of the systems where a multiplex transmission is applicable. FIG. 2 shows the structure of an embodiment where the system shown in FIG. 1 is multiplexed. In FIG. 2 reference numerals 1–8 denote communication control devices arranged in a form of a loop at respective locations in an automobile; more particularly the reference numeral 1 denotes a front right terminal FRT, 2 a front left terminal FLT, 3 a meter terminal MT, 4 a steering column terminal SCT, 5 a door left terminal DLT, 6 a rear terminal RT, 7 a door right terminal DRT and 8 a cowl terminal CT. They are respectively named by the locations they are arranged.

In this embodiment, communication control devices 1 to 8 are connected by a loop circuit using optical fibers 9. For a higher reliability, the connection is made with a duplex loop circuit using double loop circuits of opposite transmission directions. The reference numeral 10 in the FIG. 2 denotes a photo coupler. Devices shown in FIG. 1 are respectively connected to nearby communication control devices 1 to 8 in FIG. 2. In FIG. 1 the reference numeral 11 denotes a body of the automobile, 12 a front engine, 13 a fan and 14 a battery. In both FIGS. 1 and 2, the reference numerals 101 and 201 denote right and left horns, 102, 103, 202 and 203 high-beam head lamps, 104 and 204 low-beam lamps, 105 and 205 front-turn lamps, 106 and 206 clearance lamps, 107 and 207 side turn lamps, 108 and 208 motors of a remote control mirror, 109 and 209 solenoids of remote control motor, 110 and 210 lining sensors, 111 an oil pressure sensor, 112 a voltage regulator for a power generator, 211 a motor of the head light cleaner, 212 a liquid level sensor thereof, 213 a liquid level sensor of a battery, 214 a liquid level sensor for a coolant, 215 a motor for a front washer, 216 a solenoid thereof, 217 a motor of a front wiper, 218 a solenoid thereof and 301 a speed sensor. The reference numeral 302 denotes an ignition sensor, 303 a fuel meter, 304 a speed meter, 305 a tachometer, 306 a water thermometer, 307 a warning display device, 308 an odometer and trip-meter, 401 a lighting switch, 402 a dimmer switch, 403 a turn switch, 404 a hazard switch, 405 a horn switch, 406 a wiper switch, 407 a washer switch, 501 and 701 switches of right and left power windows, 502 and 702 motors thereof, 503 a lock solenoid of the door, 504 a solenoid of unlock thereof, 505 and 706 courtsies, 601 a turn lamp, 602 a tail & park lamp, 603 a tail lamp, 604 a stop lamp, 605 a back lamp, 606 a license plate lamp, 607 a rear washer motor, 608 a defogger, 609 a rear wiper motor, 610 a fuel sender, 703 a remote control mirror switch, 704 a door control switch, 705 a lamp for the door key hole, 801 a foot lamp, 802 an ignition switch lighting lamp, 803 a defogger switch lighting lamp, 804 a water temperature sender, 805 a buckle switch, 806 a courtesy switch, 807 a wiper speed volume, 808 a long park switch, 809 a parking break switch, 810 a break switch, 811 a defogger switch, 812 a rear washer wiper switch, and 813 an ignition key switch. Each lamp and fuse are provided with wire disconnection detection sensors which are in turn connected to nearby communication devices.

Figure 3:
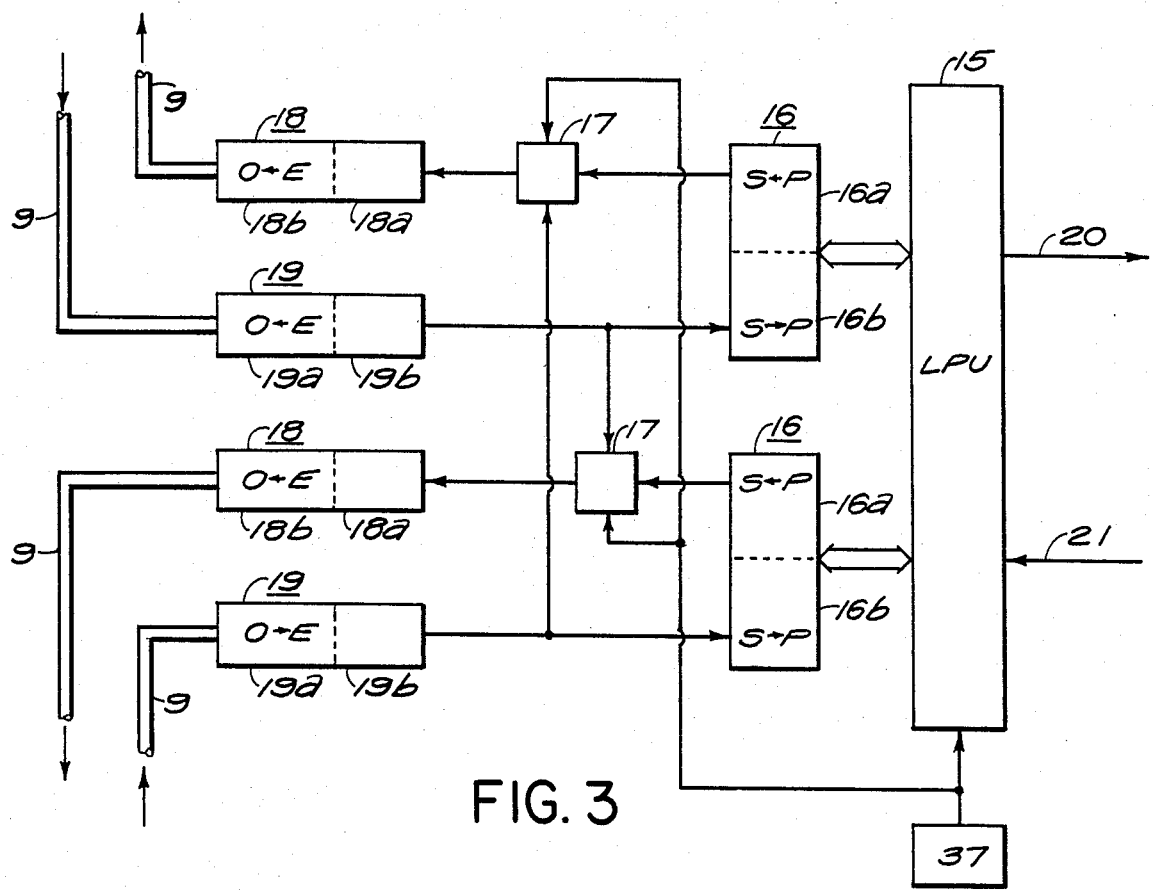
FIG. 3 schematically shows the structure of an embodiment of the communication control system.

FIG. 3 indicates an embodiment of the communication control devices 1 to 8. In the figure, the reference numeral 15 denotes a micro-computer which is called as LPU (local processor unit), and 16 a device which converts digital signals between serial type and parallel type; more particularly 16a is a parallel-to-serial converter, 16b a serial-to-parallel converter, 17 a connection switch, and 18 an electrophoto converter which converts an electric signal to an optical signal. The reference numeral 18a denotes a driver, 18b an electrophoto converter, and 19a photo-electric converter which converts an optical signal to an electric signal and more particularly 19a is a photoelectric converter and 19a is a receiver. The microcomputer 15 is connected to the devices to be controled with the line 20 and at the same time to the data source devices with the line 21 and provided, if necessary, with such attachments as a A/D converter or a D/A converter. The microcomputer 15 has functions for distributed processing and is able to select necessary data and to carry logical operation for controlling the devices. The timer functions such as for an interval adjustment for a wiper, for controlling wiper speed, for the winking cycle of turn or hazard lamps, for timer function for a rear defogger, for timer function for the illuminated entry system, for the time of jetting headlamp cleaner, for seatbelt warning time, for warning of the light forgotten to be turned off, etc. may be distributed to respective microcomputers of communication control devices. If those functions are centralized to, for example, the microcomputer of CT 8, the system can be simplified. Respective communication control devices are switched by a connection switch 17 to receive signals when the optical fiber loop circuit is closed and to transmit signals from one end of the loop circuit when it is open. The connection switch 17 is operated to separate communication control devices from the loop circuit, when the microcomputer fails, by a watchdog timer (WDT) 37 which instructs restart of the microcomputer 15.

The microcomputer 15 on the communication control devices mentioned above is operated according to the program which can be roughly classified into the data transmission routine, the control routine for the devices to be controlled and the data source devices, the data receiving routine, the monitor routine, and the default mode control routine.

Figure 4:
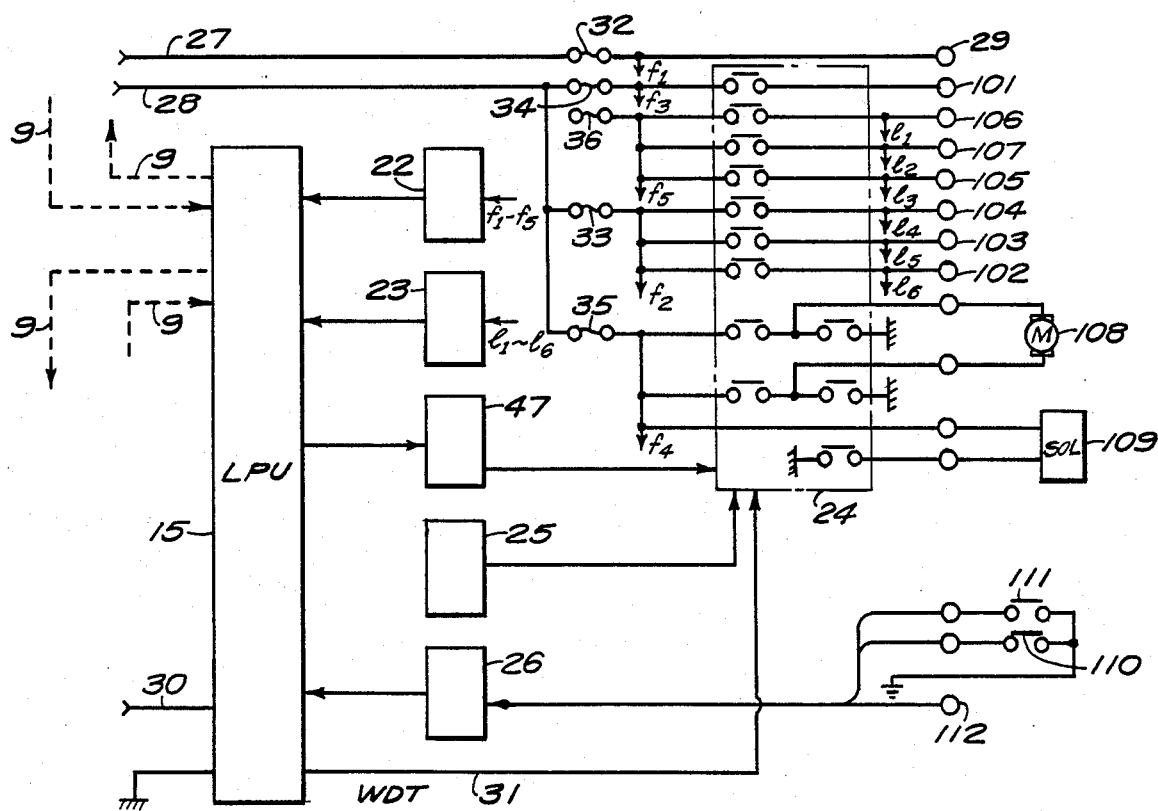
FIG. 4 is a block diagram to illustrate an example of the connection between communication control system and the devices to be controlled and the data source devices.

An example of the connection between the communication control devices and the devices to be controled and the data source devices is shown in FIG. 4 as to the case of FRT1. In the figure, the reference numeral 22 denotes a fuse disconnection detector, 23 a detector for failed lamps, 24 a semiconductor relay device, 25 a detector for the failure of rated voltage source in the FRT1, 26 an interface for sensors and switches, 27 a power circuit from an ignition key to an ignition position, 28 a power circuit at a position of accessory from the ignition key, 29 an alternator, 30 a power circuit from the battery, 31 a watchdog timer output, 32 to 36 fuses, 47 a driver, $f_1$ to $f_5$ connection circuits for detecting fuse disconnection, and $1_1$-$1_6$ connection circuits for detecting lamp failure. This FRT1 not only transmits detected data for lamp failure and fuse disconnection but also transmits the data for normal/abnormal state of lining from the lining sensor 110, the oil pressure sensor 111 and the power generator voltage regulator 112, normal/abnormal state of the oil pressure and normal/abnormal state of the regulator. Those data is transmitted to all the other communication control devices 2 to 8 via the loop circuit but is received by MT3 alone because those data is generally required by MT3 for controlling warning display device 307. On the other hand, the horn 101, the high-beam head lamps 102 and 103, low-beam head lamp 104, the front turn lamp 105, the clearance lamp 106, the side turn lamp 107 and the motor 108 and the solenoid 109 of the remote control mirror are directly controled by the senicomductor relay device 24. For such control, the data of ON/OFF from SCT4 about the lighting switch 401, the dimmer switch 402, the turn switch 403, the hazard switch 404 and the horn switch 405, and the data on ON/OFF state from DRT 7 about the remote control mirror switch 703 are differentiated from other data and are selectively received from the loop circuit. When the watchdog timer or the detector for the rated voltage source failure 25 is operated, the output therefrom is made to forcibly light the low-beam head lamp 104 and the clearance lamp 106 in order to guarantee the safety measures even if FRT1 fails.

The data is transmitted in, for instance, 8 bit/byte and a data format like the one shown in FIG. 5 is employed. The transmission from respective communication control devices 1 to 8 starts with the transmission of start bytes (a), then transmits the data bytes (b) in a necessary number and ends with the stop bytes (c). The lower 3 digits of the start byte and the stop byte, $AD_2$, $AD_1$ and $AD_0$, comprise address bits of the communication control devices. The start byte and the stop byte are identified by the upper 2 digits, [1, 0] and [1, 1]. The third digit of the start byte is a wait flag, WF, which indicates a true start byte when it is "0" but means a wait byte when it is "1" to keep other communication control devices standby until a start byte comes to release the standby. For identification, the data byte is made to be "0" in the uppermost digit and to describe data in 7 bits, $D_6$ to $D_0$. In this embodiment, the data byte is preconditioned to transmit a certain type of data depending on the sequence order.

The communication control devices are made to transmit one by one in a cycle according to the predetermined sequence. FIG. 6 shows an example of the transmission sequencial procedure. In this example the transmission is repeated in the order of FRT1→FLT2→MT3→SCT4→DLT5→RT6→DRT7→CT8→FRT1→FLT2→ .... For activating transmission, when power is turned on, FRT1 simultaneously self-checks if it is the first while FLT2 the second. FIG. 6(a) shows the transmission procedure at a normal time wherein when communication control devices 1 to 8 do not fail nor transmit wait byte, the subsequent device i+1 starts transmission after the transmission from the communication control device i immediately prior thereto. Whether the transmission from the device immediately prior thereto ends or not is detected by detecting a stop byte or by counting the number of data bytes. FIG. 6(c) indicates the transmission procedure when the device immediately prior i fails. If the transmission from the device i does not come within a predetermined time DD after the transmission from the device i−1 which is two steps before, the device i+1 automatically starts transmission to skip one procedure because if judges the device i which is immediately before fails and the transmission thereafter duly continues. The transmission from the device i is detected by receiving the start byte, data byte, or stop byte or all of them. The transmission from the device two stages before i−1 is detected in a similar manner. The predetermined time DD may differ depending on the type of byte which is used for the detection of the transmission but is set for each communication control devices 1 to 8. FIG. 6(b) indicates the transmission procedure in the case when the device immediately before i transmits a wait byte WB. In such a case, the subsequent device I+1 either extends the failure judgement time DD by a few bytes or shifts the counting point of the time DD to the time of wait byte detection. In short, it is made to repeat discriminatory step to judge whether it is a true failure or not because a wait byte may be sent out even if the device does not fail but remains in a state where it cannot transmit a data immediately, e.g. the state where data processing has taken the device too much time to send out necessary data immediately. In FIG. 6 the reference symbols #1STB to #8STB and #1SPB to #8SPB denote start bytes and stop bytes from respective communication control devices, DB$_1$ to DBn$_i$, the data byte of "n"th from the "n$_i$"th communication control device, WB a wait byte and DD the failure judgement time.

All the data of communication control devices 1 to 8 are born on the loop circuit according to the sequence order mentioned above and transmitted to communication control devices 1 to 8. Since the data to be received by the devices 1 to 8 is determined by the system, the data can be designated by the transmission order from the devices and the source devices. The necessary data alone therefore can be selected by the collation of address bits in an start byte and the counting of the number of bytes in a data byte with the devices 1 to 8. If those communication control devices 1 to 8 are connected with loop circuits so that the data from one of such devices may be transmitted to all other devices and simultaneously each of such devices may selectively receive the necessary data out of all the data transmitted thereto, each one of the devices can be made constantly ready to receive necessary data. This is a remarkable improvement compared to the conventional system wherein all the data from such devices is received exclusively by a part of the device which is provided with an editing function and then the data edited by the editing device is transmitted newly to other communication control devices because in such prior art device if the editing device fails, the whole system breaks down. Even if a part of the communication control devices is made incapable of transmission for some reason, in the system according to this invention the subsequent device will start transmission, thereby continuing the transmission without suspension of the whole system. Further the reliability in data transmission is quite high in the system according to the present invention because the communication control devices 1 to 8 repeat data transmission periodically so that receiving side may be able to receive correct data in the subsequent cycle even if the data is deteriorated by noise, etc. In the system like an automobile where noises and vibration during driving cause malfunctions, the transmission period may preferably be set at 50 ms or less.

As shown in FIG. 6 the transmission procedure is carried out by a program in the communication control device with microcomputer 15 of FIG. 3. For instance the communication control device of (i+1)th detects wait byte #iWB and start byte #iSTB from the devide i immediately therebefore and detects stop byte #i-1SPB (or the start byte #i-1STB), and further operates the timer by detecting the stop byte #i-1SPB for the following operations; (1) it starts its own transmission after the detection of the stop byte #iSPB if it detects a start byte #iSTB within a predetermined time DD of the timer. (2) If it does not detect the start byte #iSTB within the predetermined time DD after the detection of the stop byte #i-1SPB, it starts transmission without waiting for the detection of the stop byte #iSPB, and (3) if it detects the wait byte #iWB within the predetermined time DD after the detection of the stop byte #i-1SPB, it resets the timer at the time, for instance, the time of detecting the said byte to initiate the calculation of the predetermined time DD, then newly processes either (1) or (2). FIG. 7 shows an example of the communication control device which is structured without using a microcomputer. In the figure the reference numeral 38 denotes a transmission/receival circuit, and 39 a interpreting circuit for the received data. The system selectively interprets the data necessary to the particular device and outputs it to a memory 40. The memory 40 stores the outputs from the interpreting circuit 39 until it receives the subsequent data. The reference numeral 41 denotes a driver which controls the devices to be controled according to the contents of the memory 40. Semiconductor relays such as a transistor may be used. The reference numeral 42 denotes a device which detects the start byte and the stop byte from the device immediately before in the transmission order to transmit a detection signal of stop byte 48 to the transmission activation circuit 43 for activating the same. The transmission/receiving circuit 38 initiates transmission with the activation signal from the circuit 43 to transmit the data on the data source such as switches and sensors which are connected through the interface 26. This procedure corresponds to the transmission order indicated in FIG. 6(a). The detection operation of the detector 42 is reset by the pulse 44 when the transmission starts from the transmission/receiving circuit 38. The reference numeral 45 denotes a detector which detects the start byte or the stop byte from the communication control device two stages before in the transmission sequence order and which activates the timer 46 with the detection signal 49. The timer 46 is set at a time slightly after the time when the transmission from the device immediately before is supposed to start and when the time comes, transmits the timer output to the circuit 43 to activate the circuit 43 in a manner similar to the detection signal 48 from the detector 42, thereby forcing the circuit 38 to initiate transmission. This corresponds to the transmission order shown in FIG. 6(c). The detector 45 is made to be reset with the pulse 44 from the circuit 38 in a manner similar to the detector 42 while the timer 46 is made to be cleared with the detection signal 50 of start byte from the detector 42. Thanks to such a mechanism even if the device immediately before in the transmission order transmits in a normal order or slightly delayed order, the timer 46 is to be activated agains so that the transmission according to the right order indicated in FIGS. 6(a) and (b) is secured.

As communication control devices 1 to 8 are connected to loop circuits with optical fibers in the embodiments above, the system can enjoy such advantages as that it is free from the influence of electro-magnetic interference, that it has excellent insulation and that it is light in weight and most desirable for the system used in an automobile. Naturally, conventional electric transmission circuits other than optical fibers may be used. Needless to say, the present invention may be applicable to other systems than automobiles shown in preferred embodiments. A part of the communication control devices may be connected exclusively either to the devices to be controled or to the data source devices. The devices to be controled or the devices of data source may be collectively connected once in an intermediate processing device and then connected to the communication control devices instead of being directly connected therewith. A device to monitor circuits or the communication control devices over the whole system may be connected to the circuit.

As described in detail in the foregoings, the present invention capacitates smooth operation of a system with the novel transmission control method without failing the whole system even if a part of the system fails.

We claim:

1. In a transmission control system for data transmission wherein multiple devices share one circuit so that each of the devices may transmit data on the circuit according to a predetermined transmission sequence, the improvement wherein each device comprises a first detecting means to detect an immediately preceding transmission signal from another device in said predetermined transmission sequence, a second detecting means to detect a further preceding transmission signal from another device in said predetermined transmission sequence, and means for starting successive transmissions in response either to detecting, by said first detecting means, a transmission signal from said immediately preceding signal or after a predetermined time by detecting a next preceding transmission signal from still another device, whereby substantially continuous transmission is accomplished without delay due to failure of any device used in the sequential transmission of said signals.

2. The transmission control system as claimed in claim 1, wherein said detecting means detects the transmission signal from said immediately preceding devices by means for receiving a start byte attached to data bytes and transmitted from said immediately preceding device, said second detecting means detecting the preceding transmission from said another device in said predetermined transmission sequence by receiving a start byte attached to data bytes to be transmitted from said another device, or by receiving data byte transmitted from said another device or by receiving both of said start byte and data bytes, said each start byte including address bits for identification of a corresponding device.

3. The transmission system as claimed in claim 1, wherein each device further comprises means for transmitting a wait byte which includes a wait flag bit and address bits for identification of the device and wherein there is provided another device for immediately next transmission in said predetermined transmission sequence to wait its transmission, and wherein each said device further comprises means for extending said predetermined time for said transmission starting means in response to detecting said wait byte from said immediately preceding device in said predetermined transmission sequence.

4. The transmission control system as claimed in claim 1, wherein said circuit is a loop circuit.

5. The transmission control system as claimed in claim 1, wherein said circuit is a duplex loop circuit using double optical fiber loop circuits of opposite transmission directions, each said device further comprising two photo-electric converters for receiving optical signals from said duplex loop circuit, two electro-photo converters for transmitting data as optical signals onto said duplex loop circuit, and two connection switches which open said duplex loop circuit so as to direct said optical signals from said electro-photo converters to one end of the opened duplex loop circuit.

6. The transmission control system as claimed in claim 1, wherein each said device is a communication control device provided with a micro-processor-unit, said communication control device and said circuit being disposed in an automobile, and said communication control device is connected to a data source for controlling the operation thereof.

7. The transmission control system as claimed in claim 2, wherein each said device transmits a predetermined number of data bytes.

8. A transmission control system providing for sequential multiplexed signal transmission from a set of transmission devices along a common transmission line, said system providing for a sequencing of signal transmissions by detection of a signal from a previously transmitting device, the improvement comprising:
means for detecting the transmissions of respective ones of said devices during a sequence of such transmissions;
means for activating the transmission of one of said devices upon completion of a previous transmission in said sequence of transmissions; and wherein said activating means comprises:
trigger means responsive to signal detections of said detecting means for initiating a signal transmission by one of said devices upon the absence of a detection of a previous signal transmission in said sequence, said trigger means including means for delaying an initiation of signal transmission by an amount of time allocated for a previous signal transmission by said sequence.

* * * * *